US008807643B2

(12) United States Patent
Gruss et al.

(10) Patent No.: US 8,807,643 B2
(45) Date of Patent: Aug. 19, 2014

(54) SUNROOF MECHANISM LINKAGE WITH CONTINUOUS ONE PART GUIDE TRACK (71) Applicant: Tesla Motors, Inc., Palo Alto, CA (US)

(72) Inventors: Matthew Paul Gruss, San Francisco, CA (US); Marcus Christensen, Davisburg, MI (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/629,238

(22) Filed: Sep. 27, 2012

(65) Prior Publication Data
US 2013/0082486 A1 Apr. 4, 2013

Related U.S. Application Data (60) Provisional application No. 61/540,758, filed on Sep. 29, 2011.

(51) Int. Cl.
B60J 7/057 (2006.01)
B60J 7/043 (2006.01)

(52) U.S. Cl.
CPC .................................. B60J 7/043 (2013.01)
USPC ................................. 296/223; 296/216.08

(58) Field of Classification Search
USPC .......................................... 296/216.01–224
See application file for complete search history.

(56) References Cited

U.S. PATENT DOCUMENTS 6,325,453 B1 * 12/2001 Manders ..................... 296/223
6,428,091 B2 * 8/2002 Ito et al. ..................... 296/221
6,942,286 B2 * 9/2005 Bohm et al. ............. 296/216.05

* cited by examiner

Primary Examiner — Dennis H Pedder
(74) Attorney, Agent, or Firm — J. Richard Soderberg (57) ABSTRACT Continuous cross sectional profile guide tracks in an outer sliding sunroof/moonroof are provided where both the front and rear mechanism or mechanism links travel fore/aft in the same channels as each other and have fore/aft travel that is limited only by vehicle architecture. The guide track channel is partly or entirely outside/outboard of the primary water/wind sealing system of the sunroof.

13 Claims, 8 Drawing Sheets

SUNROOF MECHANISM LINKAGE WITH CONTINUOUS ONE PART GUIDE TRACK

CROSS REFERENCE TO RELATED APPLICATIONS

This Application claims the benefit of U.S. Provisional Application 61/540,758 filed on Sep. 29, 2011, the contents of which are expressly incorporated by reference thereto in its entirety for all purposes.

This application is related to the following US applications, all filed on the same date as the present application: U.S. patent application Ser. No. 13/628,980 which claims benefit of U.S. Provisional Application 61/540,557 titled "In-Line Outer Sliding Panorama Sunroof Tracks" and filed on Sep. 29, 2011; U.S. patent application Ser. No. 13/629,169 which claims benefit of U.S. Provisional Application 61/540,648 titled "Cam Mechanism Integrated Into Structural Sunroof Framework" and filed on Sep. 29, 2011; U.S. patent application Ser. No. 13/629,248 which claims benefit of U.S. Provisional Application 61/540,930 titled "Sunroof Utilizing Two Independent Motors" and filed on Sep. 29, 2011; and U.S. patent application Ser. No. 13/629,392 which claims benefit of U.S. Provisional Application 61/541,021 titled "Sunroof Positioning and Timing Elements" and filed on Sep. 29, 2011, the contents of all these non-provisional and provisional applications are all hereby expressly incorporated by reference thereto in their entireties for all purposes.

FIELD OF THE INVENTION

The present invention relates generally to passenger compartments, and more specifically, but not exclusively, to a moveable roof track assembly of a passenger vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Outer sliding panels (also commonly referred to as sunroofs, moonroofs, panorama roofs, panoramic roofs and other trade names herein referred to generically as a sunroof) are sunroofs where a movable panel (made of glass, sheet metal, metal reinforcements, polycarbonate or a combination of these or similar materials), from its closed position, lifts or tilts and then moves into a position above a fixed panel where it effectively provides an opening in the roof to the outside air. This can give occupants the feel of openness towards the sky similar to a retracted convertible top. The larger the open air opening ("hands through opening") and the larger the transparent opening when the moving panel is closed ("day light opening") the more value is gained regarding this feeling.

Typical outer sliding sunroof designs use two sets of guide tracks with independent mechanism guide channels in different cross-car positions (Y) or a single guide track but through machining operations the mechanism guide channels are effectively independent of one another concerning their positions in the cross-car (Y) direction. The forward guide track channel and mechanism components are normally contained inside of the wind/water sealing system. As such, the fore/aft travel of the moving panel is restricted to be within the perimeter of that sealing system.

Alteration to existing sunroof systems must consider any impact on NVH (noise, vibration, and harshness) characteristics. Improvements in the opening size and reductions in complexity and part count that improve manufacturability and reliability cannot come at the expense of degradation in NVH characteristics.

What is needed is a system and method for improving sunroof implementations to increase hands through opening and day light opening characteristics while reducing any negative impact upon vehicle NVH.

BRIEF SUMMARY OF THE INVENTION

Disclosed are a system and method for improving sunroof implementations to increase "hands through opening" and "day light opening" characteristics while reducing any negative impact upon vehicle NVH.

The following summary of the invention is provided to facilitate an understanding of some of technical features related to sunroof implementations, and is not intended to be a full description of the present invention. A full appreciation of the various aspects of the invention can be gained by taking the entire specification, claims, drawings, and abstract as a whole. The present invention is applicable to other passenger compartments.

An assembly supporting movement of a moveable panel relative to an exterior opening defined in a wall of a passenger compartment, including a pair of continuous tracks installed on the wall of the passenger compartment and disposed on opposing sides of the exterior opening, each track including a first channel and a second channel parallel to and separated from the first channel by a guide rib having a first wall disposed in the first channel and a second wall disposed in the second channel; a pair of first mechanical linkages coupled to a pair of opposing edges of the moveable panel with the first mechanical linkages moveably coupled to the first channel; a pair of second mechanical linkages coupled to the pair of opposing edges and moveably coupled to both the first channel and the second channel while engaging both the walls of the guide rib; and a pair of lifting/tilting control structures disposed in the second channels that interact with the second mechanical linkages to influence an elevation/tilt profile of the moveable panel without the pair of lifting/tilting control structures interacting with the first mechanical linkages moving in the first channel.

A method of operating a moveable roof panel overlying an opening in a roof of a passenger compartment of a vehicle including: coupling forward mechanical linkages to a pair of opposing lateral edges of the moveable roof panel; coupling rearward mechanical linkages to the opposing lateral edges of the moveable roof panel; installing a pair of discrete monolithic lateral tracks onto the roof on opposing sides of the opening, each the discrete monolithic lateral track defining a first longitudinally-extending guide channel and a second longitudinally-extending guide channel parallel to the first longitudinally-extending guide channel with the guide channels of each track separated by a guide rib; coupling respectively the forward mechanical linkages to the first guide channels; coupling respectively the rearward mechanical linkages to the first guide channels; and transitioning repeatably the moveable panel between an open mode and a closed mode by moving the mechanical linkages in the first channels without interruption.

Some embodiments of the present invention described herein provides a continuous cross sectional profile guide tracks in an outer sliding sunroof where both the front and rear mechanism or mechanism links travel fore/aft in the same channels as each other and have fore/aft travel that is limited only by the vehicle architecture, while the rear mechanism additionally disposed in a separate track to independently interact with a lift/tilt control structure.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The present invention eliminates environment seal limitations on hands through and day light opening dimensions while simplifies guide track complexity, assembly requirements, and cost. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method improving sunroof implementations to increase hands through opening and day light opening characteristics while reducing any negative impact upon vehicle NVH. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
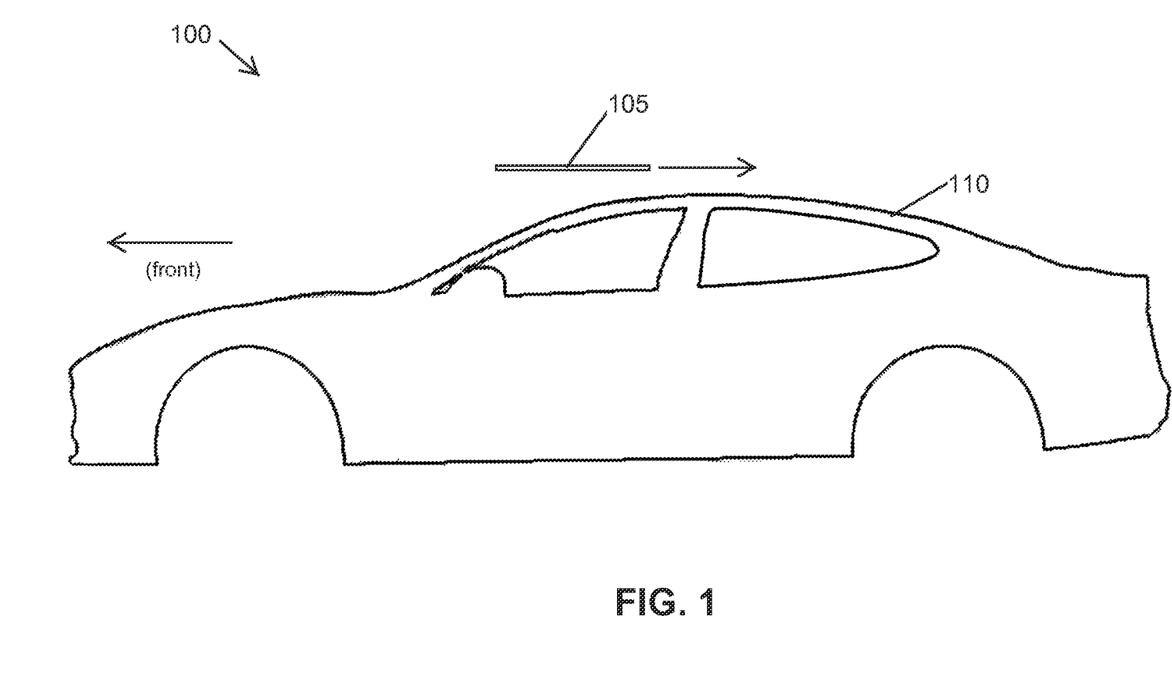
FIG. 1 illustrates a side profile of a vehicle passenger compartment outfitted with in-line outer sliding panorama sunroof tracks.

FIG. 1 illustrates a side profile of a vehicle passenger compartment 100 outfitted with a set of in-line outer sliding panorama sunroof tracks. A sunroof 105 installed in a roof portion 110 of compartment 100 moves fore and aft along the set of tracks. Sunroof 105 is shown schematically above roof portion 110 for ease in visualization but it is understood that it is moveably installed in roof portion 110 as shown and described elsewhere herein.

Figure 2:
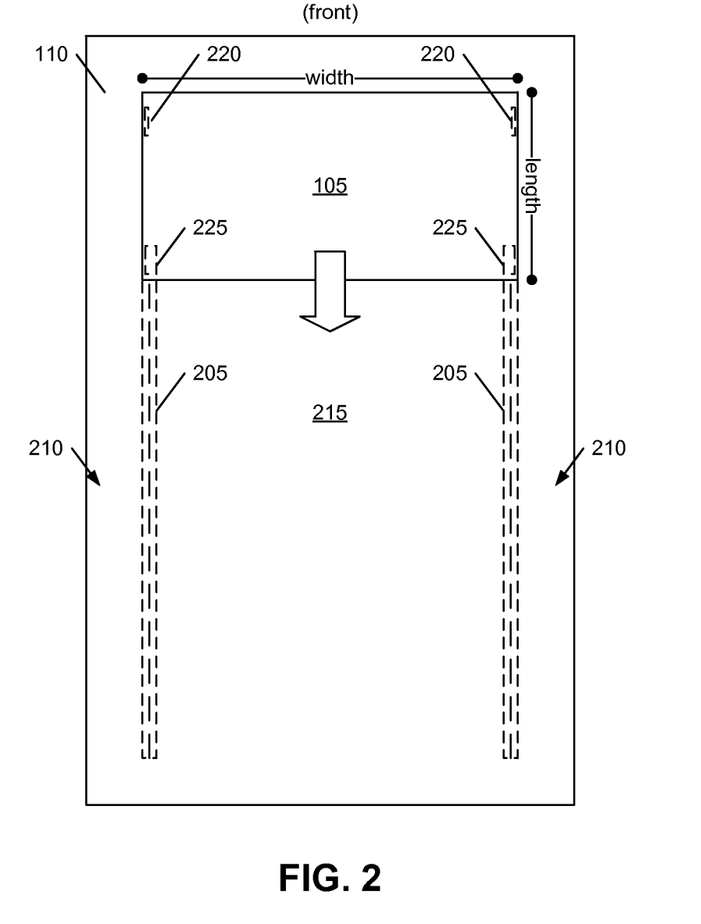
FIG. 2 illustrates a generic representation of a top view of the roof portion of the compartment illustrated in FIG. 1 with the sunroof in the closed mode.

FIG. 2 illustrates a generic schematic representation of a top view of roof portion 110 of compartment 100 illustrated in FIG. 1 with sunroof 105 in a closed mode. A sunroof track 205 is installed at lateral edges 210 of roof portion 110. Sunroof 105 is located above a forward seating area of compartment 100 and moves rearwardly over a region 215 of roof portion 110 when opened. Sunroof 105 provides an aerodynamic profile when closed, and therefore a rear edge of sunroof 105 is in-line with a front edge of region 215. To move rearwardly, sunroof 105 is required to rise up and out of this position when initiating the rearward opening motion to pass over region 215. Further, sunroof 105 drops down and into this position when finishing its closing action. Region 215 may be provided with a fixed moonroof or a solid panel over a rear seating or cargo compartment.

Track 205 is manufactured as a single continuous guiding assembly, such as for example, by an extrusion (e.g., metallic or plastic) process, a roll formation process, a machining process, or the like. Track 205 may be of any length and is installed as a parallel mirror complement to track 205 on an opposing lateral edge 210. The length of track 205 controls how far sunroof 105 may move (i.e., a fore/aft travel distance), which in turn influences a maximum length of sunroof 105. Sunroof 105 may be made longer the further that track 205 runs along lateral edge 210.

Each track 205 includes two parallel guide channels that run its entire length. Sunroof 105 is moveably coupled to these channels using linkage mechanisms that ride in these channels. Sunroof 105 includes a pair of forward linkages 220 (one for each track 205) and a pair of rearward linkages 225 (one for each track 205). In the preferred embodiment, forward linkage 220 and rearward linkage 225 for the same track 205 are disposed in the same physical channel, for example an outermost channel. Additionally, rearward linkage 225 is also disposed in an innermost channel. This enables rearward linkage 225 to independently interact with a lifting/lowering assembly (e.g., a cam or other structure) to lift the rearward edge of sunroof 105 when opening and to lower the rearward edge when closing. The common continuous channel offering unimpeded opening potential can have non-continuality forward/rearward of rearward linkage 225 depending on which way the moveable panel is to open. This non-continuity on one side of the central rib offers valuable space for other functional or non-functional elements such as wind deflector mountings.

The length of track 205 is affected by an architecture of compartment 100. In conventional systems, a sealing system for sunroof 105 limits the width/length as well as the fore/aft travel distance. In this implementation, the fore/aft travel distance of sunroof 105 is not limited by the sealing system (described later) but rather only limited by architectural demands (for example, a length of roof, a desired head room for the rear seat row(s), an inclusion of a hatchback frame, and a requirement to not continue the travel motion over the backlights or rear window, and the like).

Consequently sunroof 105 is able to achieve significantly larger hands through opening and day light opening sizes than one built with typical construction. Further, these embodiments greatly simplify assembly and manufacturability while allowing reductions in cost because fewer parts are required.

Figure 3:
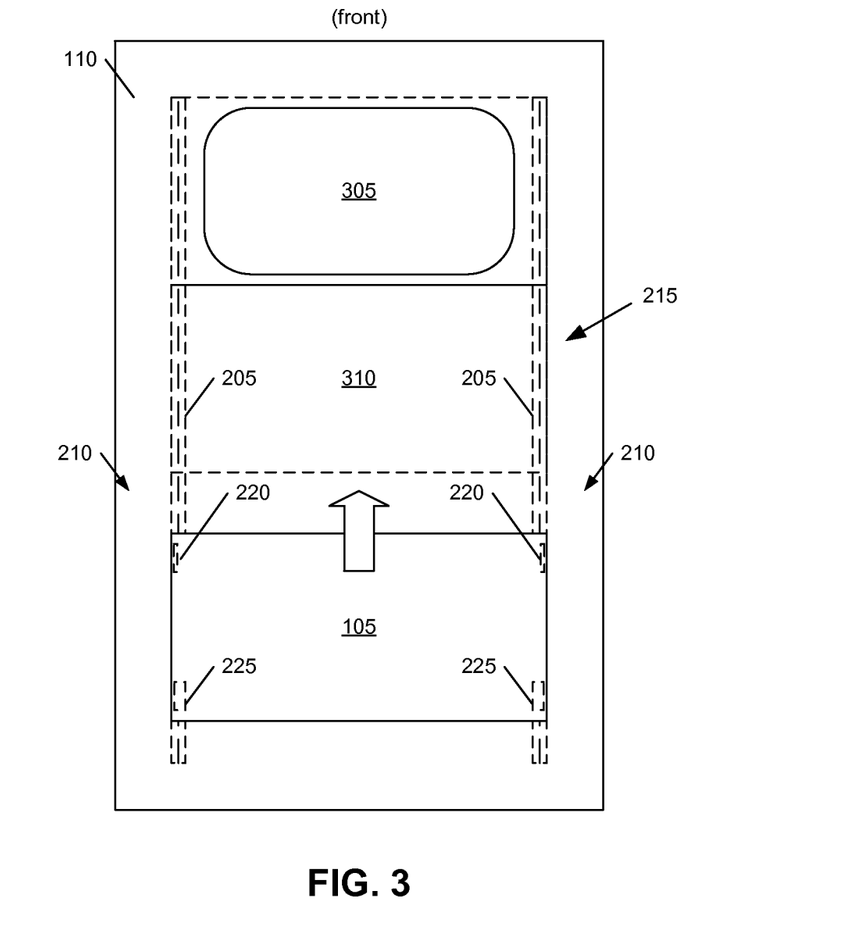
FIG. 3 illustrates the generic representation of FIG. 2 with the sunroof in the open mode.

FIG. 3 illustrates the generic representation of FIG. 2 with sunroof 105 in the open mode. When opened, sunroof 105 reveals a compartment opening 305 that had been previously covered and sealed against the environment. When track 205 is long enough, sunroof 105 may be moved far enough back to uncover enough of region 215 that an optional moonroof 310 in region 215 may be uncovered as well.

Figure 4:
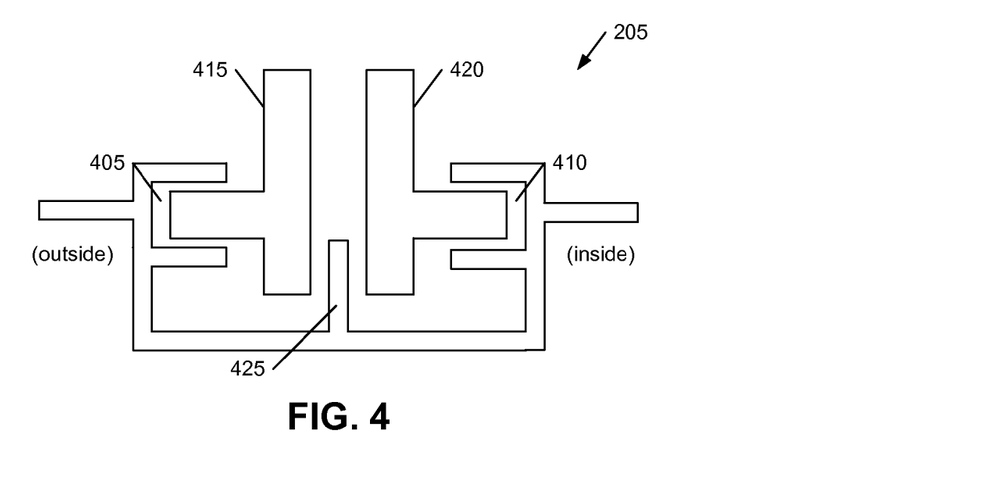
FIG. 4 illustrates a cross-sectional view of a sunroof track.

FIG. 4 illustrates a cross-sectional view of sunroof track 205 as looking from front-to-back of a left-hand-side track 205. Track 205 includes an outer continuous channel 405 and an inner continuous channel 410, with one of the channels having a potential for non-continuality to support operational and functional elements. For example a rear mechanism lifting/lowering cam may define a point of non-continuality, with continuity extending rearward from the rear mechanism lifting/lowering cam when disposed in the inner channel as shown. A representative outer channel engagement element 415 is duplicated in part of forward linkage 220 and in part of rearward linkage 225. A representative inner channel engagement element 420 is part of rearward linkage 225. A vertical guide rib 425 separates outer continuous channel 405 and inner continuous channel 410. Vertical guide rib 425 provides mechanical support and guidance for structures moving within the channels.

As discussed above, when sunroof 105 is opening, it must lift. This lifting is needed in order to provide clearance above region 215. In order for sunroof 105 to lift, it is actuated by lifting (or cam) elements to do so. These lifting elements are required to act upon both forward linkage 220 and rearward linkage 225. Forward linkage 220 is close to the front of sunroof 105 and when sunroof 105 is closed it is at the very forward end of track 205. Rearward linkage 225, when sunroof 105 is closed resides within track 205. In order to realize an unlimited opening potential, these embodiments provide channel 405 as one continuous guide channel in which both forward linkage 220 and rearward linkage 225 are guided inside. Channel 405 provides these linkages with appropriate mechanical support and guidance over the entire travel length of sunroof 105. These aspects are provided by the guide track design in combination with the design of rearward linkage 225 to initiate lifting when opening, and concluding lowering when closing, sunroof 105 with respect to opening 305.

Figure 5:
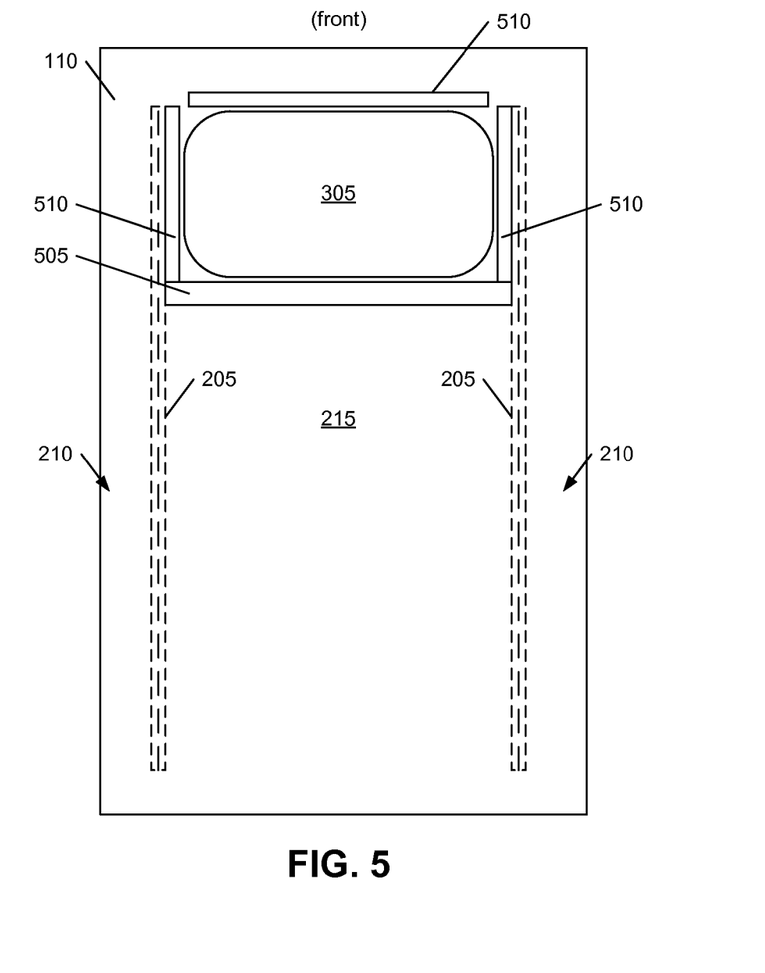
FIG. 5 illustrates the generic representation of FIG. 1 without top panels to reveal a structural cross-bow and sealing surfaces.

FIG. 5 illustrates the generic representation of FIG. 1 without sunroof 105 to reveal a structural cross bow 505 and a sealing surface 510. Cross bow 505 bridges a space of region 215 between tracks 205 without extending over either track 205. Cross bow 505 adds structural stability and strength, enhancing roof crush and side impact performance. Sealing surface 510 includes a compression seal cooperative with sunroof 105 when in the closed mode that provides environmental exclusion. While sealing surfaces are shown along lateral and edges, embodiments of the present invention may change, enhance, and/or remove some or all of the sealing surfaces to meet different performance and operational goals. Environmental components, such as wind noise and liquid elements (e.g., rain), are inhibited from entering opening 305 when sunroof 105 is closed and sealed. This arrangement of cross bow 505 and sealing surface 510 provides channel 405 and channel 410 of track 205 partly/entirely outside of the primary wind/water sealing system of roof portion 110. This, in turn, enables fore/aft travel of sunroof 105 to be limited only by vehicle architecture.

Various embodiments of the present invention have increased performance and operation of sunroof 105 by use of thinner, lighter weight materials than conventional sunroof materials. These materials include various plastics, polymers, and the like are not only thinner and lighter (and may be enhanced with ultraviolet shielding and other environmental protections, but because of the enablement of larger-sized openings, produce a larger-sized sunroof. In some cases, the larger size and the lighter/thinner material can introduce a design issue as sunroof 105 may negatively impact vehicle noise, vibration, and harshness (NVH). Embodiments of the present invention may include a latching system incorporated into sunroof 105 and cross bow 505 (e.g., a "hook" on a rearward edge of sunroof 105 for selective engagement with/disengagement from a complementary "latch" on a midpoint location of cross bow 505). The latching system helps to reduce NVH factors by securing the trailing edge of sunroof 105 and enhancing any environmental sealing as well. The latching/unlatching is preferably automatic with closing/opening, respectively, sunroof 105.

Preferably a mechanical/electromechanical system is coupled to the linkage mechanisms in order to move them. Movement of the linkage mechanisms operates sunroof 105 to move it between the closed mode and the opened mode. The mechanical/electromechanical system may be motorized or manually operated.

One other key aspect of the track cross section as it relates water ingress into the vehicle interior is placement of a drive cable channel. In some embodiments this drive cable channel is integrated into a framework structure and is positioned at the top of outer 405 channel to use gravity, trim seal, and geometry to prevent water from entering into an interior of the vehicle. This circular channel runs to the motors which drive the roof as further described in the incorporated patent applications.

Figure 6:
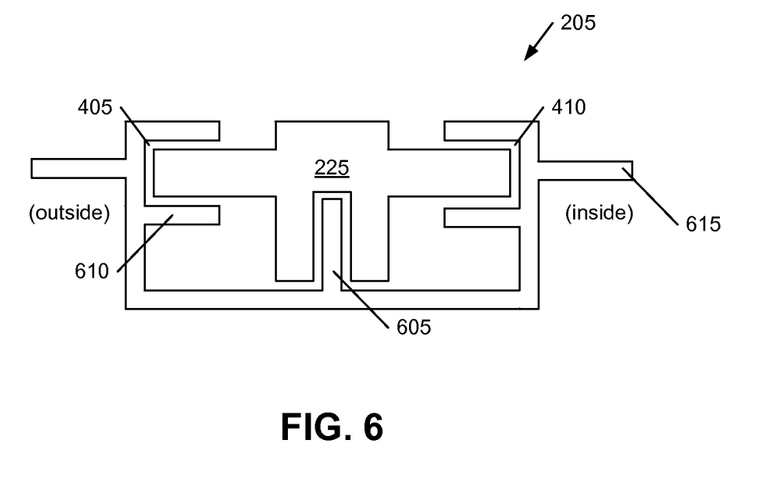
FIG. 6 illustrates a representative implementation of a rearward mechanical linkage coupled to the sunroof track.

FIG. 6 illustrates a cross-sectional generalized view of sunroof track 205 supporting rearward linkage 225. As noted in FIG. 4, track 205 includes an outer channel 405 and an inner channel 410. Track 205 also includes a vertical guide rib 605 that separates outer channel 405 from inner channel 410. Outer channel 405 includes a horizontal guide rib 610 and inner channel 410 includes a horizontal guide rib 615. The guide ribs serve to limit superfluous X and Y motion of rearward linkage 225 as it moves within track 205.

As shown, rearward linkage 225 includes engagement structures for both outer channel 405 and inner channel 410 to surround vertical guide rib 605 to minimize lateral motion of rearward linkage 225 and the attached sunroof 105. The horizontal guide ribs minimize elevational motion of rearward linkage 225 and the attached sunroof 105. By this arrangement, these potential NVH-contributing factors of the novel design for continuous track 205 are minimized.

This disclosed orientation provides a foundation for stabilized movement of sunroof 105. The benefits of the arrangement include the increased occupant space in the passenger compartment and ability to size an installation of track 205 with fewer limitations. Continuous track 205 allows for a continuous stabilized travel of both forward and rearward mechanical linkages from the closed mode to a completely opened mode. The arrangement for rearward linkage 225 in track 205 addresses challenges related to enabling venting (lifting and tilting the rear edge of sunroof 105) through interaction with a lifting/tilting structure in track 205 while avoiding interference between the lifting/tilting structure and the forward mechanical linkage moving in track 205 without introducing NVH-type issues or poor structural performance.

Providing an outer channel in track 205 for both forward and rearward linkages to move while using guide ribs (particularly supporting the rearward mechanical linkage on both sides of vertical guide rib 605) for stability and disposing the lifting/tilting structure for just the rearward mechanical linkage into a separate channel meets those challenges.

Preferably a mechanical/electromechanical system is coupled to the linkage mechanisms in order to move them which operates sunroof 105 and moves it between the closed mode and the opened mode. The mechanical/electromechanical system may be motorized or manually operated.

Figure 7:
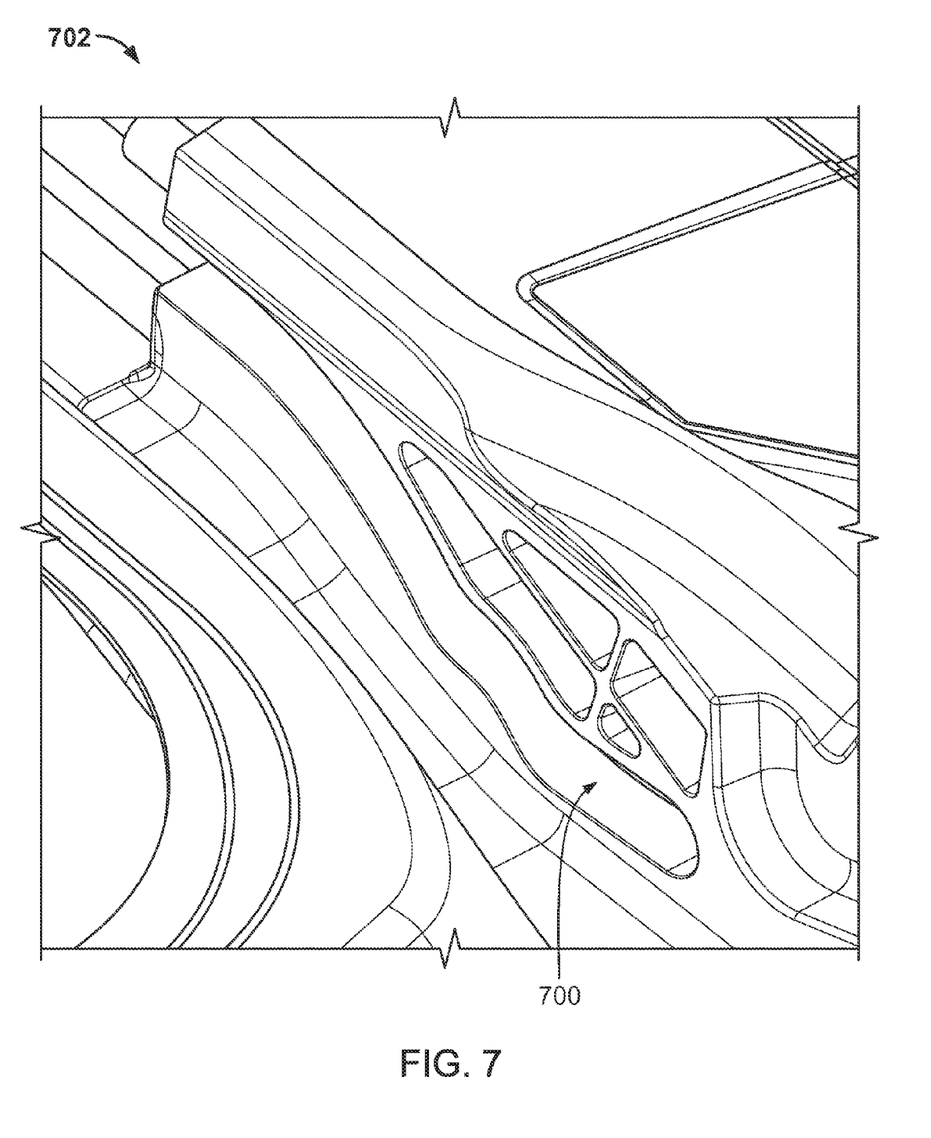
FIG. 7 provides a close-up of a cam slot in a left front corner of a sunroof framework.

FIG. 7 provides a close-up of a cam slot 700 in a left front corner 702 of a sunroof framework. The cam slot of the sunroof mechanism system is integrated directly into the structural elements of the sunroof framework. In a preferred embodiment, the cam slot is integrated into the structural pieces at each of the front corners of the sunroof base frame, left and right sides. The guide shoes of the front mechanism links slide through channels in the guide tracks and directly into the cam slot of this front piece of the framework. As the guide shoes travel through the length of the cam slots, the mechanism links and thus the moving panel is lifted and lowered. The cam slots are molded directly into this injection molded plastic piece of the framework.

Figure 8:
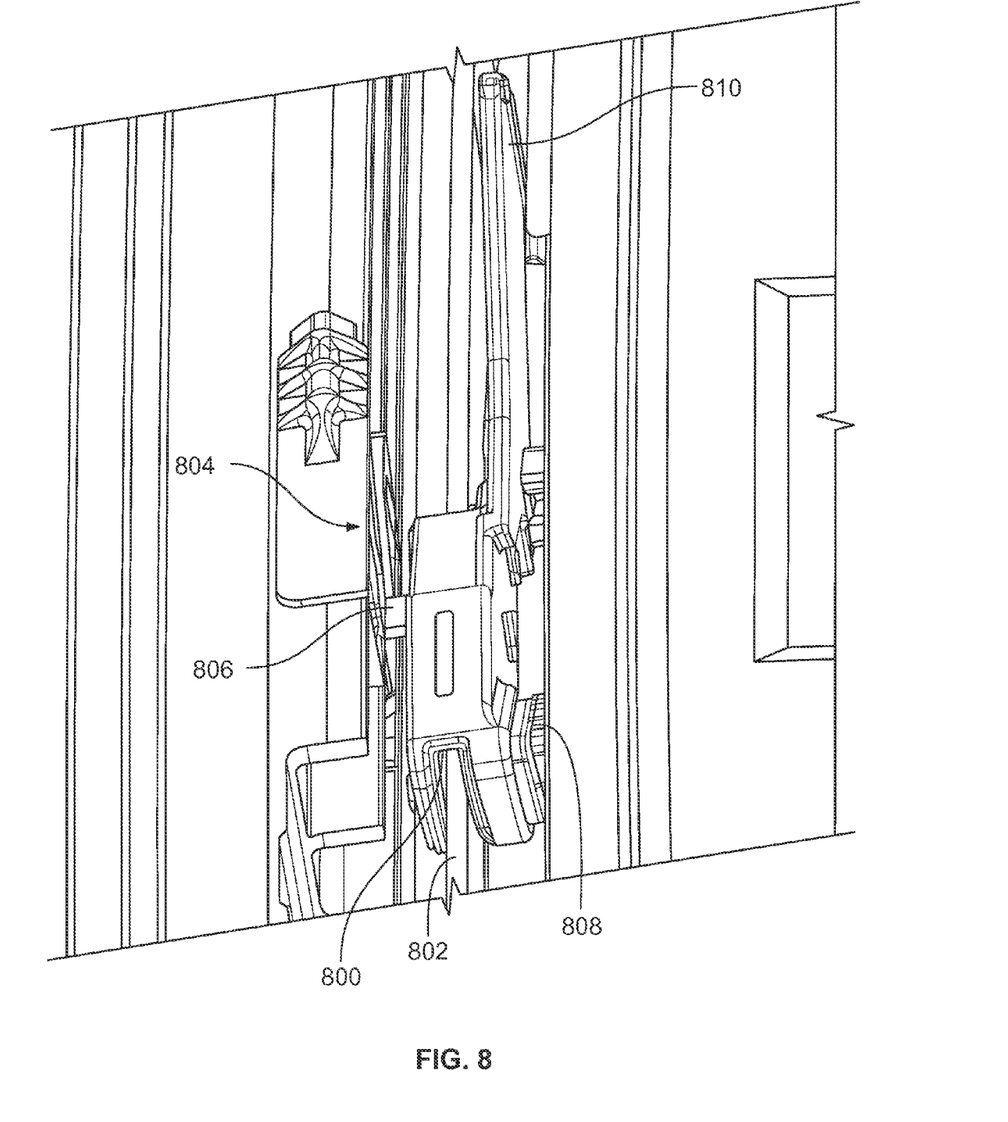
FIG. 8 illustrates the rear mechanism linkage in the movable panel closed position.

Referring now to FIG. 8, the rear mechanism linkages include a guiding channel which captures the mechanism side to side as the surfaces of the guide channel slide against and over a vertical guide rib coming off of the guide track. Particularly, the rear mechanism linkage includes a guide slot 800 that slides against a vertical guide rib 802 on the guide track and provides lateral support.

In order to have a continuous travel path for both mechanisms from the very front to the very rear, it is necessary to not have the actuating element of the rear mechanism linkage in the way. The rear mechanism linkage has a lift actuating element (cam) 804. The lift actuating element (cam) 804 is to one side of the vertical guide rib 802 such that there is a continuous path from the front to the rear on the other side of the vertical guide rib. In this example, the lift actuating element (cam) 1004 is located in the inside channel on the driver side of the vehicle. The rear mechanism linkage has a guide pin 806 that interfaces inside the lift actuating element (cam) 804.

Moreover, the rear mechanism linkage has a guide pin 808 that interfaces with a continuous front to rear guide channel in the guide track. The rear mechanism linkage has an attachment point 810 where the moveable panel is attached to the rear mechanism linkage.

Figure 9:
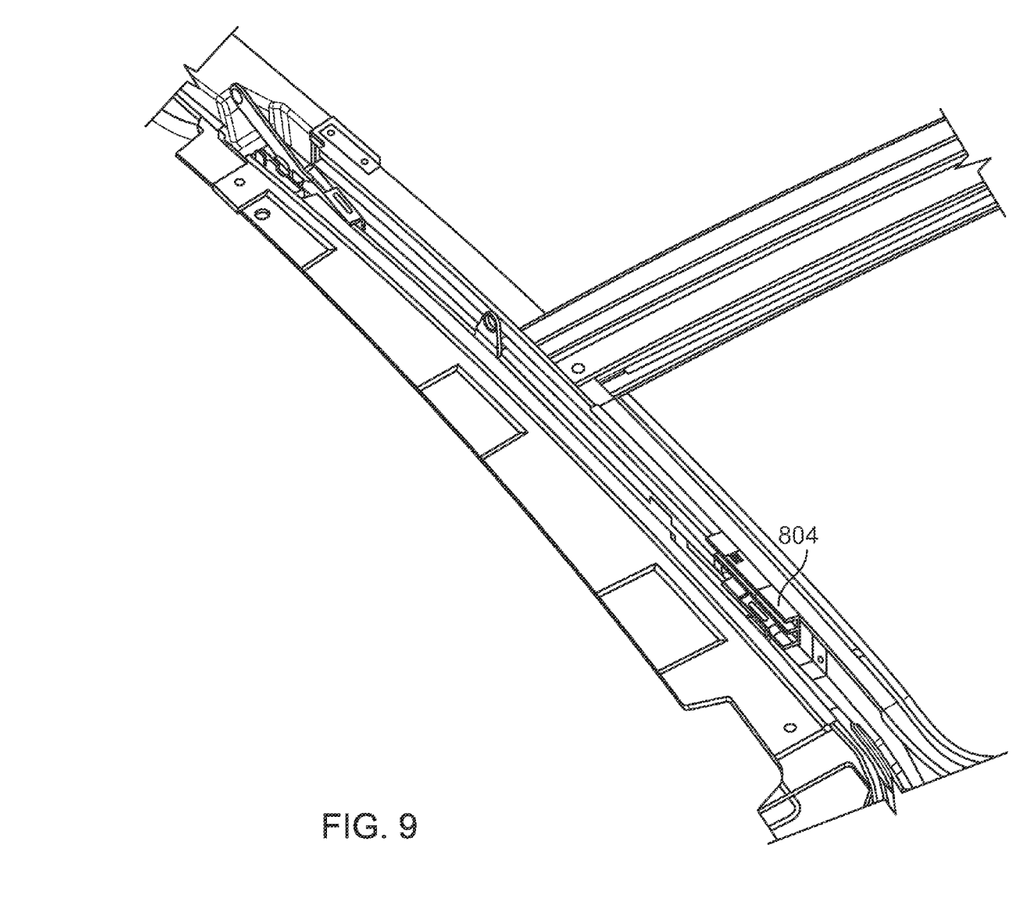
FIG. 9 provides a perspective view of a portion of a sunroof guide track and a structural cross bow.

Referring now to FIG. 9, it provides a perspective view of a portion of a sunroof guide track and a structural cross bow. The lift actuating element (cam) 804 is visible. In this example, the lift actuating element (cam) 804 is located in the inside channel on the passenger side of the vehicle.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An assembly supporting movement of a moveable panel relative to an exterior opening defined in a roof of a passenger compartment, comprising:
   a pair of continuous tracks installed on the roof of the passenger compartment and disposed on opposing sides of the exterior opening, each track including a first channel and a second channel parallel to and separated from said first channel by a guide rib having a first wall disposed in said first channel and a second wall disposed in said second channel wherein said tracks extend from a forward location proximate a forward region of the roof towards a rearward location of a rearward region of the roof wherein said first channel includes a first continuity extending unobstructed from said forward location to said rearward location and said second channel includes a second continuity extending from said forward location to said rearward location;
   a pair of first mechanical linkages coupled to a pair of opposing edges of the moveable panel with said first mechanical linkages moveably coupled to said first channel;
   a pair of second mechanical linkages coupled to said pair of opposing edges and moveably coupled to both said first channel and said second channel while engaging both said walls of said guide rib; and
   a first structure disposed in a particular one second channel of said second channels that interrupts said second continuity of said particular one second channel without interrupting said first continuities.

2. The assembly of claim 1 wherein for each said track, said first channel includes an outer channel and said second channel includes an inner channel disposed between said outer channel and the exterior opening.

3. The assembly of claim 1 further comprising a second structure disposed in a second particular one second channel of said second channels that interrupts said second continuity of said second particular one second channel without interrupting said first continuities.

4. The assembly of claim 3 wherein said structures include lifting/tilting control structures that interact with said second mechanical linkages in said second channels to influence an elevation/tilt profile of the moveable panel without said lifting/tilting control structures interacting with either said first mechanical linkages moving in said first channels and portions of said second mechanical linkages moving in said first channels.

5. The assembly of claim 4 wherein said lifting/tilting control structures each include a cam surface disposed in said inner channels and wherein each said second mechanical linkage includes a cam contact surface interacting with said cam surface when influencing said elevation/tilt profile.

6. The assembly of claim 1 wherein said channels of each said track are proximate each other from said forward location to said rearward location.

7. The assembly of claim 6 wherein each said track includes a single monolithic structure extending from said forward location to said rearward location, said single monolithic structure defining said channels and said guide rib.

8. The assembly of claim 7 wherein said single monolithic structure includes a single discrete extruded element defining said channels and said guide rib.

9. The assembly of claim 8 wherein said single monolithic structure includes a single discrete roll-formed element defining said channels and said guide rib.

10. The assembly of claim 8 wherein said single monolithic structure includes a single discrete molded element defining said channels and said guide rib.

11. The assembly of claim 6 wherein said mechanical linkages are restrained to move within said channels by said guide rib.

12. The assembly of claim 5 wherein said channels of each said track are proximate each other from said forward location to said rearward location.

13. The assembly of claim 12 wherein said lifting/tilting structures are constrained on a second channel side of said guide rib.

* * * * *

UNITED STATES PATENT AND TRADEMARK OFFICE
CERTIFICATE OF CORRECTION

PATENT NO. : 8,807,643 B2  
APPLICATION NO. : 13/629238  
DATED : August 19, 2014  
INVENTOR(S) : Gruss et al.

Page 1 of 1

It is certified that error appears in the above-identified patent and that said Letters Patent is hereby corrected as shown below:

On the title page, item (72), at the end of the Inventors list add: Mitchell Stephens, Lexington, Kentucky (US)

Signed and Sealed this
First Day of March, 2016

Michelle K. Lee
*Director of the United States Patent and Trademark Office*